United States Patent [19]
Åkerberg

[11] 3,973,200
[45] Aug. 3, 1976

[54] PROCESS FOR ACKNOWLEDGING CALLS IN A SYSTEM FOR WIRELESS STAFF LOCATORS

[75] Inventor: Dag E:son Åkerberg, Jarfalla, Sweden

[73] Assignee: Telefonaktiebolaget L M Ericsson, Stockholm, Sweden

[22] Filed: Jan. 23, 1975

[21] Appl. No.: 543,365

Related U.S. Application Data

[63] Continuation-in-part of Ser. No. 410,015, Nov. 26, 1973, abandoned.

[52] U.S. Cl. .................................... 325/55; 325/64; 340/312
[51] Int. Cl.² ........................................... H04B 5/04
[58] Field of Search .................. 325/16, 53, 55, 64, 325/302, 361, 395, 31; 340/311–313; 343/6.5 R, 6.5 SS

[56] References Cited
UNITED STATES PATENTS

| | | |
|---|---|---|
| 3,210,665 | 10/1965 | Street .................................... 325/55 |
| 3,376,506 | 4/1968 | Sontag .................................... 325/64 |
| 3,478,344 | 11/1969 | Schwitzgebel et al. ............. 340/313 |
| 3,529,243 | 9/1970 | Reindl .................................... 325/55 |
| 3,678,391 | 7/1972 | Gough .................................... 325/55 |
| 3,798,545 | 3/1974 | Schultz et al. ......................... 325/64 |
| 3,858,212 | 12/1974 | Tompkins et al. .................... 325/55 |

Primary Examiner—Robert L. Griffin
Assistant Examiner—Jin F. Ng
Attorney, Agent, or Firm—Hane, Baxley & Spiecens

[57] ABSTRACT

In a system for wireless staff location where non-coded acknowledgement signals are transmitted from a called staff locator to identify the staff locator from which the acknowledgement signal is sent which is characterized by the fact that the acknowledgement signal is allotted to the staff locator whose coded call signal was last transmitted.

3 Claims, 4 Drawing Figures

PROCESS FOR ACKNOWLEDGING CALLS IN A SYSTEM FOR WIRELESS STAFF LOCATORS

This is a continuation-in-part from our patent application Ser. No. 410,015, filed Nov. 26, 1973, now abandoned.

The present invention relates to a method or process for identifying an acknowledgement signal in a system comprising a central station including means for repeatedly and cyclically transmitting coded call signals and a number of transceivers. Each of the transceivers includes means for the selective reception of the coded call signals, an alarm emitter, a manually actuated acknowledgement means and an acknowledgement signal transmitter for delivering an acknowledgement signal to signify that a call signal directed to the transceiver in question has been received and recognized by a person carrying the transceiver. The process allows the transmission in close sequence of different calls to several different transceivers without the acknowledgement signals from different transceivers interferring with each other.

Hitherto it has been a rule that in systems for wireless staff location, the called person is to reply to the call by reporting via telephone to, for example, an exchange. Methods are also known in which the called person replies by means of a wireless transmitter with speech or tone to signify that the call has been received. This has an advantage when a quick reply should be desired or if a telephone is not accessible. Since, in general, only one reply radio channel is accessible it can be difficult with this latter method to execute a great number of selections per unit time; if a first call should be replied only after a long wait, calls to other persons must wait so that the replies do not interfere with each other.

Systems are already known, e.g. from the U.S. Pat. No. 3,478,344, where interrogating signals are sent from a control station, the signals being coded to be received by a selected transceiver among a plurality of transceivers, each carried by a person. The transceiver includes signal transmitting means, means for generating a transceiver unit identity signal and means responsive to the interrogating signal for applying automatically to the signal transmitting means such identity signal. The transceiver includes also a manual signal input and an actuating control which allows the person carrying the transceiver to signal the control station independently of the interrogating and identity signalling. No action from the person carrying the transceiver is necessary for causing the signal transmitting means to send the identity signal. The patented system is therefore not suitable for staff locating purposes, but only for supervising purposes.

The German Pat. No. 878,516 teaches a radio communication system where an acknowledgement signal, coded to identify the called substation, is delivered from the transceiver on condition that a coded call signal has been received at the transceiver together with one additional condition.

In a staff locating system according to the invention the acknowledging signals from the transceivers are not coded but are similar from each transceiver of the system. It is an object of the invention to allow the transceivers to be of a simpler and more compact design that what is normal for transceivers in staff locating systems. The transceiver emitting an acknowledgement signal is nevertheless identified; the signal is allotted to the transceiver whose call has been sent last.

Another object of the invention is to further speed the calling of more persons per time unit by inhibiting further calls to a transceiver as soon as an acknowledgement signal has been allotted to it.

Another object of the invention is to speed the calling still further by transmitting the coded call signals at another carrier frequency than that of the acknowledgement signals, thus allowing both types of signals to be sent in closer sequence.

The method according to the invention is described below by way of an example and with reference to the accompanying drawings, where FIG. 1 shows a staff locator system comprising a central station and a plurality of transceivers;

Figure 1:
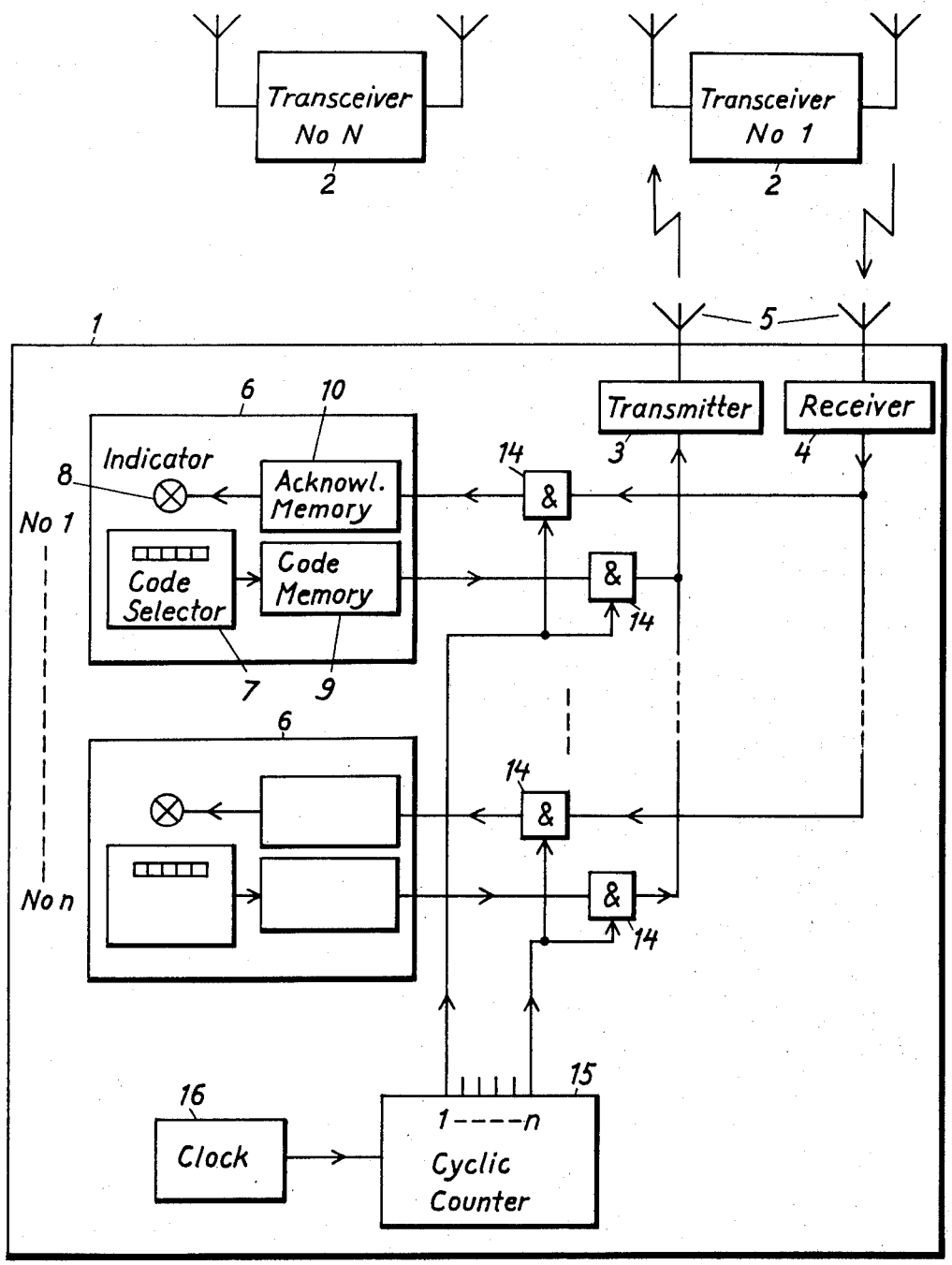

A staff locator system where the method for acknowledging calls according to the invention is applicable, comprises, as shown in FIG. 1, a central station 1 and a plurality of portable transceivers 2. The central station 1 incudes a transmitter 3 and a receiver 4 which are connected each to one antenna 5; several operating panels 6 including code selector push buttons 7, an indicator 8, a code memory 9 and an acknowledgement memory 10; gates 14 arranged for connecting the operating panels to the transmitter and the receiver; a cyclic counter 15 for causing one pair of gates to connect one operating panel after another to the transmitter and receiver; a clock generator 16 for stepping the cyclic counter 15.

Figure 2:
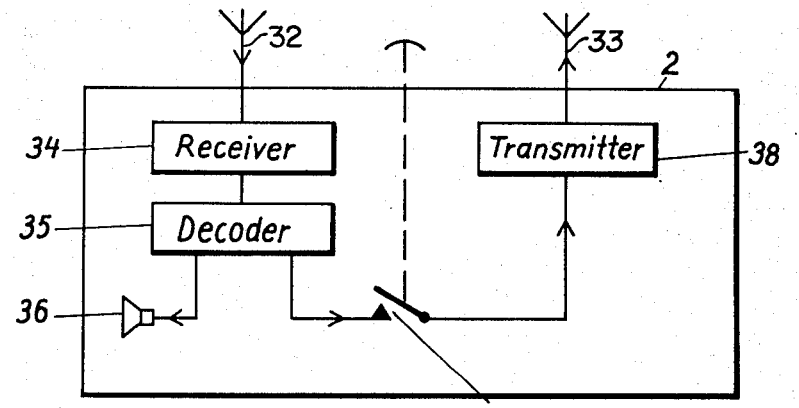
FIG. 2 shows in principle the arrangement of one transceiver.

Each transceiver 2, see FIG. 2, comprises a receiver 34, a decoder 35 and an alarm emitter 36, e.g. a loud speaker for emitting audible alarm signals. A radio transmitter 38 is connectable via a manually operated switch 37 to the decoder 35. An antenna 32, 33 is connected to each of the receiver 34 and transmitter 38.

Figure 3:
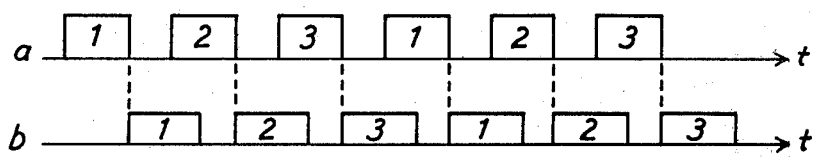
FIG. 3 shows a timing diagram of the transmission from a central station of three different selection calls and emission of alarms from called transceivers.

In the method according to the invention the central station 11 is caused to repeatably transmit calls coded in order to be trapped by a selected transceiver. If calls are to be transmitted to several different transceivers, they are transmitted in close sequence under control of cyclic counter 15 stepped by clock 16, in the described example with short interruptions between the calls, as appears from the timing diagram a in FIG. 3. When all calls have been transmitted, they are repeated in the same order until replies have been received, or until the transmission for other reasons is interrupted. The call code to a transceiver is normally transmitted only once in a call cycle.

When the receiver 34 of a transceiver 2 has received a call which is recognized as belonging to the transceiver it will emit a short alarm signal such as, for example, an audible signal. This is illustrated by the timing diagram b in FIG. 3.

That a transceiver in a system for wireless staff location can be arranged to selectively receive coded calls from a central station and upon receiption emit an audible signal is shown in U.S. Pat. No. 3,114,142. U.S. Pat. No. 3,478,344 teaches how a transceiver is arranged in order to produce an output signal in response to an interrogating signal from a central station. It should therefore be apparent to those skilled in the art how to construct transceiver 2.

Figure 4:
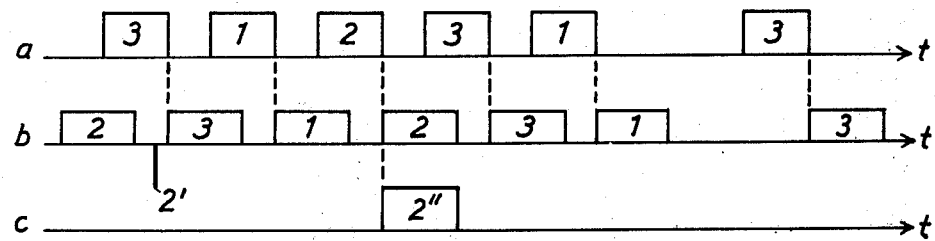
FIG. 4 shows a timing diagram with the same content as in FIG. 3 and also the transmission of an acknowledgement signal from a transceiver.

The person who is carrying the transceiver is to acknowledge the alarm signal by closing an acknowledgement contact 37 in FIG. 2 after he hears the alarm signal. Thus no acknowledge signal is sent until contact 37 is closed. On condition that the acknowledgement contact 37 is closed the reply transmitter 38 arranged at the transceiver will, each time the alarm is emitted owing to the fact that a call has been received, simultaneously with this alarm, transmit an acknowledgement signal. The process is described by means of the timing diagrams in FIG. 4, which shall be regarded as a continuation of FIG. 3, and where diagram $a$ illustrates calls from the central station to three individual transceivers, diagram $b$ audible alarm signals emitted from the respective transceivers and diagram $c$ acknowledgement signals transmitted from the transceivers back to the central station. It is assumed that the person carrying the transceiver No. 2 has heard the audible alarm at 2 in the beginning of diagram $b$ and has closed the acknowledgement contact 37 at 2'. Next time the audible alarm is emitted from the transceiver 2 an acknowledgement signal is simultaneously sent to the central station (at 2'' in diagram $c$).

The central station which has transmitted the calling signal is by means of a pair of open gates 14 ready to receive acknowledgement signals during a short time after transmission of each call, i.e. the central station is ready for reception during the same time as an alarm is emitted from the transceiver and an acknowledgement signal is transmitted.

The acknowledgement signals are the same from all transceivers; in the central station there is indicated that a reply has been received from the transceiver, whose calling signal had been transmitted last. In that way the replying transceiver will be recognized with certainty, since an acknowledgement signal is transmitted from only one transceiver at a time, i.e. from the one which has received a call coded for the transceiver in question.

A call to a given transceiver needs at best be transmitted only twice; once for the alarm to be emitted from the receiver and if the acknowledgement contact after that is closed before the next call is received, and, only once more for the transceiver to be caused to transmit the acknowledgement signal. Otherwise the calls are repeated as required. In the process of calling the transceivers there can also be included that the reception of an acknowledgement signal from a transceiver causes the interrupting of continued transmission of calls to that transceiver.

In the process for acknowledgement can be included that the calling signal and acknowledgement signal are transmitted with different carrier frequencies. In that way the central station can transmit a call simultaneously as the receiver of the central station is receiving, or is ready to receive, an acknowledgement signal from the transceiver which was called with the next preceding call. This process results in the fact that the central station can transmit more calls per unit time than if the central station must withhold new calls until a complete reply to previous calls has been received as would be necessary if the calling signal and the acknowledgement signal were transmitted with the same carrier frequency.

In the process according to the invention there can finally be included that the acknowledgement signal is produced by a carrier frequency signal at the acknowledgement transmitter inserted into the transceiver which is modulated with a frequency which is the same for all transceivers which are included in one and the same system, but separated from the frequency which is used for modulation of the acknowledgement signal in each similar system which is so situated that its reply transmissions can be mistaken for the reply transmissions in the first system.

The process for acknowledgement of wireless call transmission here described is intended to be used preferably in systems for wireless staff location, but it can also be used in other systems, where calls to several separate receivers are to be transmitted and answered.

We claim:

1. In a system having a central station including means for repeatedly and cyclically transmitting coded call signals and a number of substations each including means for selectively receiving the coded call signals, an alarm emitter, a manually actuated acknowledgement means and an acknowledgement transmitter for delivering an acknowledgement signal signifying that a call signal directed to the substation in question has been received and recognized, and its alarm emitter has emitted an alarm signal, a method for identifying at the central station which substation has transmitted the acknowledgement signal received at the central station comprising the steps of at a substation, on condition that its acknowledgement means has been manually actuated after the alarm signal has been recognized, transmitting a short acknowledgement signal which is the same for all substations immediately after the call signal occurring after manual actuation of the acknowledgement means has been received and recognized as being directed to the substation, keeping the central station ready for a short time interval after the transmission of a call signal to receive an acknowledgement signal, and allotting the received acknowledgement signal to the substation whose coded call signal was last transmitted.

2. The method of claim 1 wherein the call signal and the acknowledgement signal are transmitted with different carrier frequencies.

3. The method of claim 1 wherein the acknowledgement signal produced by the acknowledgement transmitter of the substation is a carrier frequency signal modulated with a modulating signal having a frequency which is characteristic for each individual system.

* * * * *

UNITED STATES PATENT OFFICE
CERTIFICATE OF CORRECTION

PATENT NO. : 3,973,200
DATED : August 3, 1976
INVENTOR(S) : Dag E:son Åkerberg

It is certified that error appears in the above-identified patent and that said Letters Patent are hereby corrected as shown below:

Foreign Application Priority Data

November 7, 1972    Sweden    14388/72

Signed and Sealed this

Twenty-first Day of September 1976

[SEAL]

Attest:

RUTH C. MASON
Attesting Officer

C. MARSHALL DANN
Commissioner of Patents and Trademarks